(12) United States Patent
Higgins et al.

(10) Patent No.: US 7,578,656 B2
(45) Date of Patent: Aug. 25, 2009

(54) HIGH PRESSURE TURBINE DISK HUB WITH REDUCED AXIAL STRESS AND METHOD

(75) Inventors: Craig William Higgins, Liberty Township, OH (US); Charles Chris England, Covington, KY (US); Joeseph Charles Kulesa, West Chester, OH (US); Andrew John Lammas, Maineville, OH (US)

(73) Assignee: General Electric Company, Schenectady, NY (US)

( * ) Notice: Subject to any disclaimer, the term of this patent is extended or adjusted under 35 U.S.C. 154(b) by 439 days.

(21) Appl. No.: 11/306,224

(22) Filed: Dec. 20, 2005

(65) Prior Publication Data

US 2007/0140864 A1 Jun. 21, 2007

(51) Int. Cl.
*F01D 5/02* (2006.01)
(52) U.S. Cl. .................... 416/244 A; 416/248
(58) Field of Classification Search ............... 416/115, 416/244 A, 248; 415/176, 191, 199.5, 211.2
See application file for complete search history.

(56) References Cited

U.S. PATENT DOCUMENTS

| | | | | | |
|---|---|---|---|---|---|
| 4,879,793 | A | * | 11/1989 | Stuecker et al. | 416/244 A |
| 5,275,534 | A | * | 1/1994 | Cameron et al. | 416/95 |
| 5,586,860 | A | * | 12/1996 | Bertrand et al. | 415/115 |
| 5,630,703 | A | | 5/1997 | Hendley et al. | |
| 5,860,789 | A | * | 1/1999 | Sekihara et al. | 416/244 A |
| 6,457,942 | B1 | * | 10/2002 | Forrester | 416/244 A |
| 7,241,111 | B2 | * | 7/2007 | Harding et al. | 416/244 A |

FOREIGN PATENT DOCUMENTS

GB 2112461 A * 7/1983

* cited by examiner

*Primary Examiner*—Richard Edgar
(74) *Attorney, Agent, or Firm*—Adams Intellectual Property Law, P.A.; William Andes (57) ABSTRACT

A gas turbine engine disk that includes a centrally disposed disk hub having an integrally-formed, radially outwardly extending web terminating at an outer end. The disk hub has a radially-displaced annular hub surface exposed to high pressure, high temperature discharge gases during engine operation. The radially-displaced annular hub surface acts as an axial free surface mitigating the formation undesirable axial stress in the disk hub.

6 Claims, 6 Drawing Sheets

HIGH PRESSURE TURBINE DISK HUB WITH REDUCED AXIAL STRESS AND METHOD

TECHNICAL FIELD AND BACKGROUND OF THE INVENTION

This invention relates to gas turbine engines, and more specifically to the reduction of axial stress in disk hubs of gas turbine aircraft engines. The invention is disclosed and explained in this application with specific reference to high pressure turbine ("HPT") disk hubs of gas turbine aircraft engines. Severe thermal gradients at the hub of HPT disks during takeoff can lead to high compressive axial stresses at the center of the hub surface. This high axial stress can lead to calculated life values well below engine program requirements. Prior art solutions have included large reductions in thermal gradients and/or the disk rim loading, or a large increase in hub size. These solutions negatively impact engine performance.

More particularly, current practices to reduce axial stress include adjusting the disk rim load, hub size, or idle hub flow to get adequate life from the disk hub. The approach of adjusting the disk rim load is indirect. The weight of the blades is reduced in order to reduce the hoop stress in the disk to the point that it meets life requirements even with the high axial hub stress. This approach has negative life and performance implications for the blade. Adjusting the hub size is indirect as well. This practice also reduces the hoop stress so that the disk will accommodate the large axial stress with acceptable life. This approach has negative weight and thermal performance impacts for the disk. Increasing the engine idle hub flow directly reduces the axial stress on the hub by warming the disk prior to takeoff. This, in turn, reduces the thermal gradient that causes the high axial stress. However, the high hub flow has negative system performance implications.

The invention disclosed and claimed in this application addresses this problem in a novel manner and thereby reduces axial stress on the HPT disk hub without disadvantageous tradeoffs incurred with prior art solutions.

SUMMARY OF THE INVENTION

According to one aspect of the invention, geometric features are introduced into the disk hub to mitigate high axial stress in HPT disk hubs.

According to another aspect of the invention, a chamfer is formed into the inner diameter of the disk hub According to another aspect of the invention, radial grooves are formed in the hub surface.

According to yet another aspect of the invention, hub material is removed along a line parallel to an axial stress isoline.

DETAILED DESCRIPTION

Figure 1:
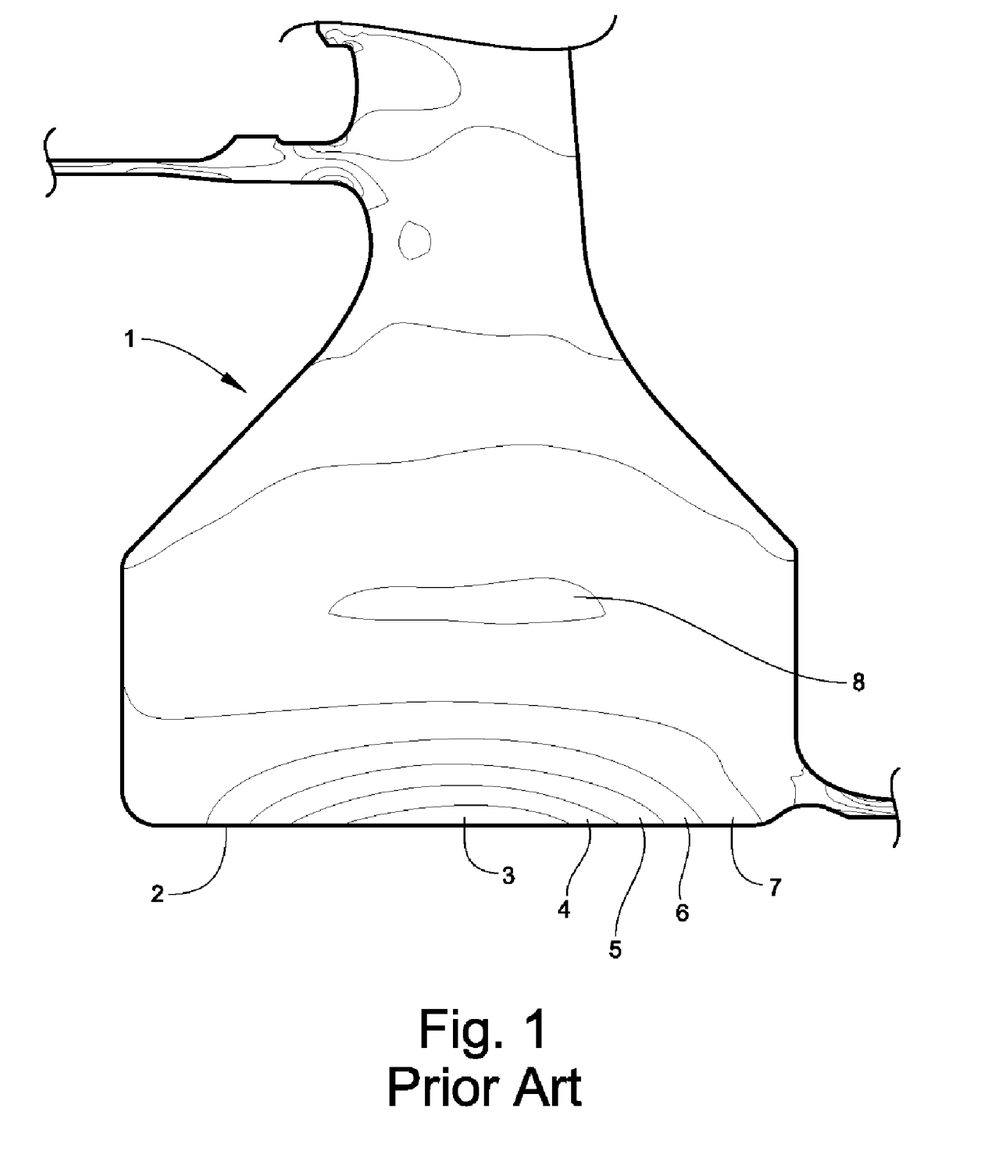
FIG. 1 is a partial vertical cross-sectional view of a HPT disk hub with indicated axial thermal gradients according to a prior art HPT disk hub design.

A typical prior art disk hub is shown in FIG. 1 at reference numeral 1, and includes a hub surface 2. Stress gradient lines 7-3 indicate progressively higher stresses towards the hub surface 2. This occurs as the material at the hub surface 2 increases in temperature and thermally expands. The interior material of the disk hub 1 is cooler, as indicated by a relatively cool interior area 8 of reduced stress that restrains the thermal expansion of the hotter material closer to the surface 2 of the hub 1. The stress peaks in the center, as shown, and falls away at the opposing ends due to the axial free surfaces that permit the expansion. As described below, reducing the distance from the center of the hub to a free axial surface has been shown to reduce the magnitude of the central axial stress.

Figure 2:
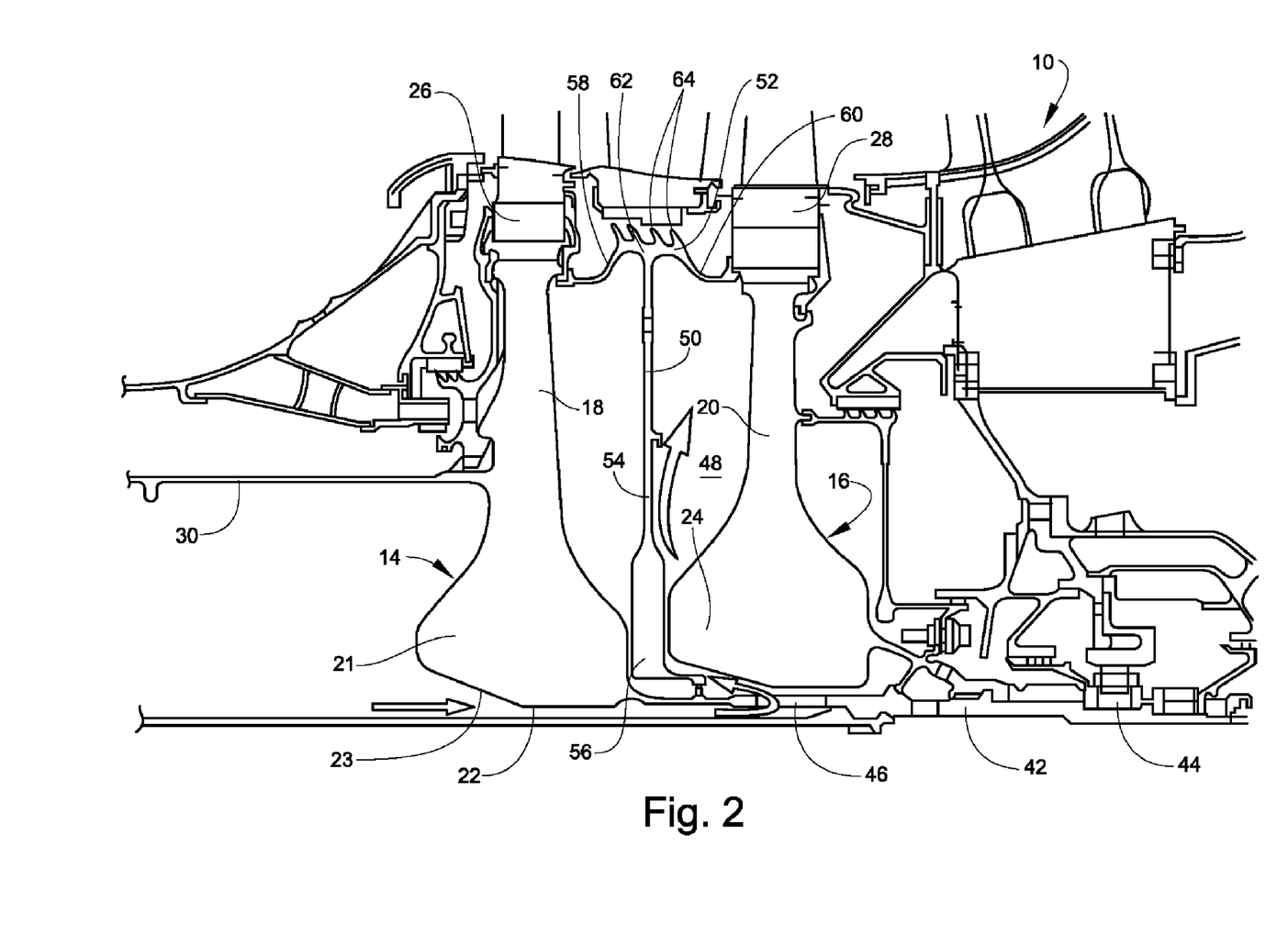
FIG. 2 is a fragmentary cross-section, taken along a longitudinal axis, of the HPT section of a gas turbine engine.

FIG. 2 illustrates a portion of a HPT section 10 of an aircraft high bypass ratio gas turbine engine. The HPT section 10 includes first and second stage disks 14, 16, having respective webs 18, 20 extending outwardly from respective hubs 21, 24. The first stage disk hub 21 includes a hub surface and a chamfer 23, as described in further detail below. Dovetail slots 26, 28 are formed on the outer ends of the webs 18, 20, respectively.

The first stage disk 14 includes a forward shaft 30 that is integral with the web 18. Hub 21 of the first stage disk 14 includes a rearwardly-extending aft shaft 42 that is press-fitted into engagement with a bearing 44. The shaft 42 includes a plurality of openings 46 that allow cooling air to enter the interstage volume 48. An interstage seal 50 is positioned between the first stage disk 14 and the second stage disk 16, and includes an outer shell 52 and a central disk 54 having a hub 56. Shell 52 is generally cylindrical with forward and aft-extending curved arms 58 and 60 that extend from a mid-portion 62 that supports seal teeth 64 and attach to the respective disks 14, 16.

Figure 3:
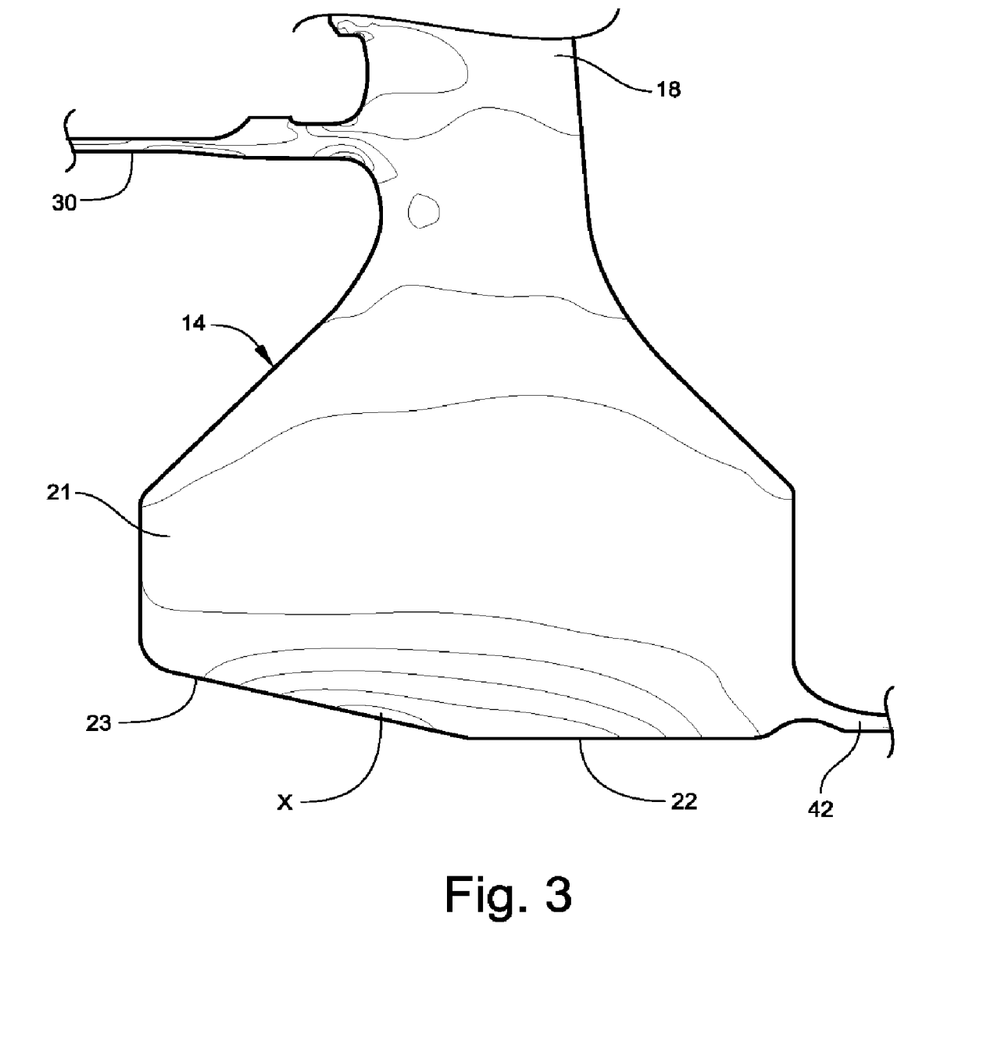
FIG. 3 is a partial vertical cross-sectional view of a HPT disk hub with indicated axial thermal gradients according to a HPT disk hub design in accordance with one aspect of the invention.

Referring now to FIG. 3, the surface 22 of the disk hub 21 is provided with a radially-displaced chamfer 23 on the forward end of the hub surface 22. This places a free surface, i.e., a "corner", of the chamfer 23 immediately below the coolest portion of the hub 21, thereby forcing the axial stress to be the greatest at an off-center position, thereby decreasing its magnitude. This is shown in FIG. 3, where the area of greatest stress, indicated at "X" is shifted to a forwardly off-center position.

Optimum shape, angle, size and dimensions of the chamfer are determined empirically by implementing a design change and then reviewing the effect of the change through computer analysis to observe the resulting stresses, rather than by a purely analytical method. The design process is adapted to balance the decrease in axial stress with an accompanying increase in hoop stress caused by lowering the cross-sectional area of the disk hub 21.

In a preferred version, the chamfer 23 intersects the non-chamfered portion of the hub surface 22 at the same axial location as the center of maximum axial tensile stress. The chamfer 23 is preferably planar, as shown, with radiused fore and aft transitions and may be between about 0 and 50 degrees.

Prior art disk hubs in a specific General Electric gas turbine engine were rated at 11,000 cold start cycles. Incorporation of the chamfer as shown and described above into a computer simulation resulted in an improvement to 15,300 cold start cycles, enabling the engine to meet program life requirements.

Figure 4:
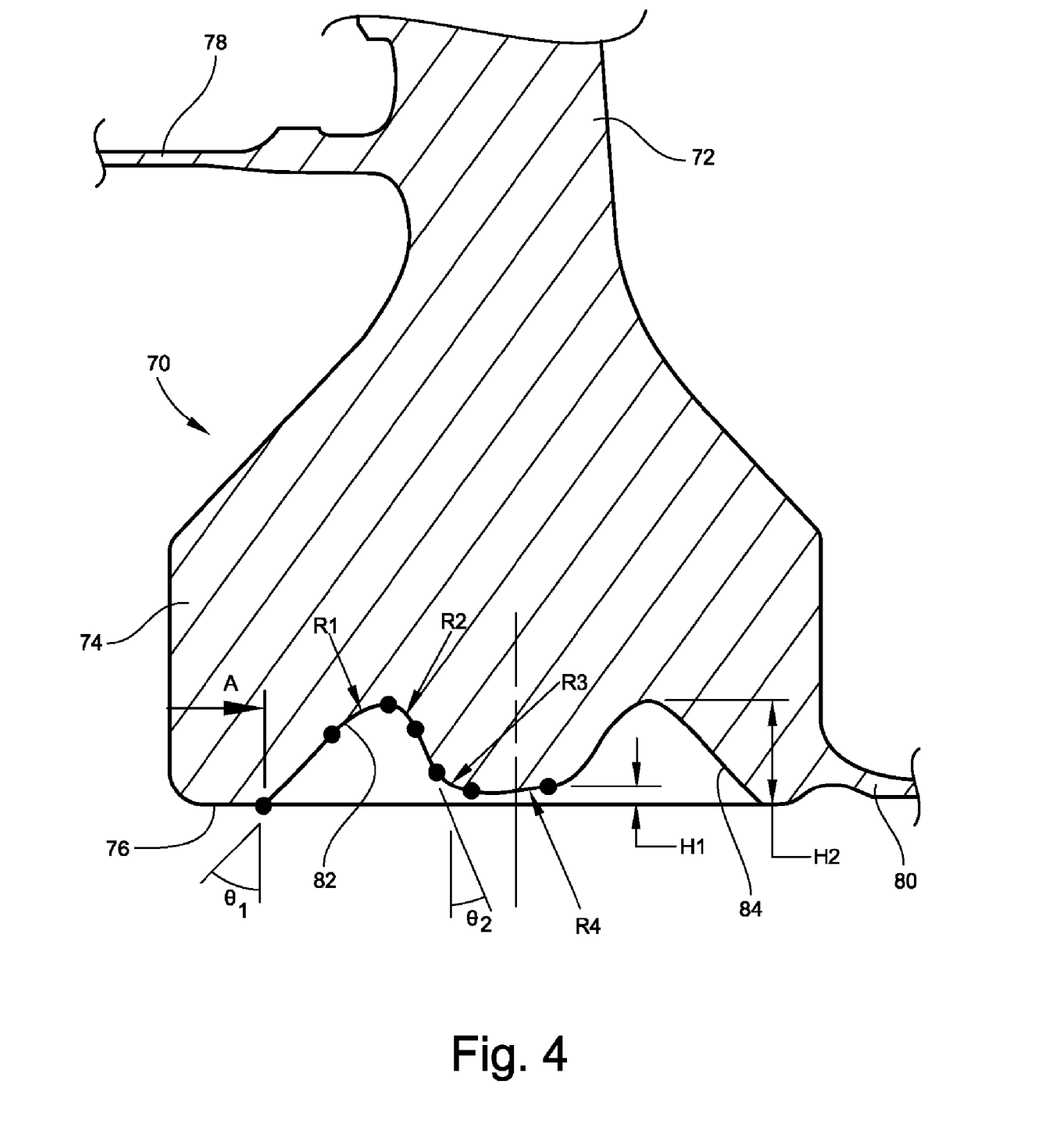
FIG. 4 is a partial vertical cross-sectional view of a HPT disk hub in accordance with another aspect of the invention.

Similar improvements may be obtained with a variety of techniques. As is shown in FIG. 4, a disk 70 includes an integrally-formed web 72 and a disk hub 74 with a hub surface 76. The disk 70 includes an integrally-formed forward shaft 78 and a rearwardly-extending aft shaft 80. The hub surface 76 is provided with radial grooves 82 and 84, the shape of which is defined by the nine indicated variables. Thermostructural DOE is used to determine the appropriate design space to achieve minimum stress in the hub 74. Average hoop stress, burst margin and selected rim stress are other variables that must be taken into account. The grooves 82 and 84 effectively cut the axial stress path at the hub surface 76. Somewhat less material is removed from the hub 74 for a given amount of stress reduction in comparison with the chamfered hub surface 22 shown in FIG. 3, thereby minimizing the increase in disk hoop stress resulting from the reduction in disk cross-sectional area.

Figure 5:
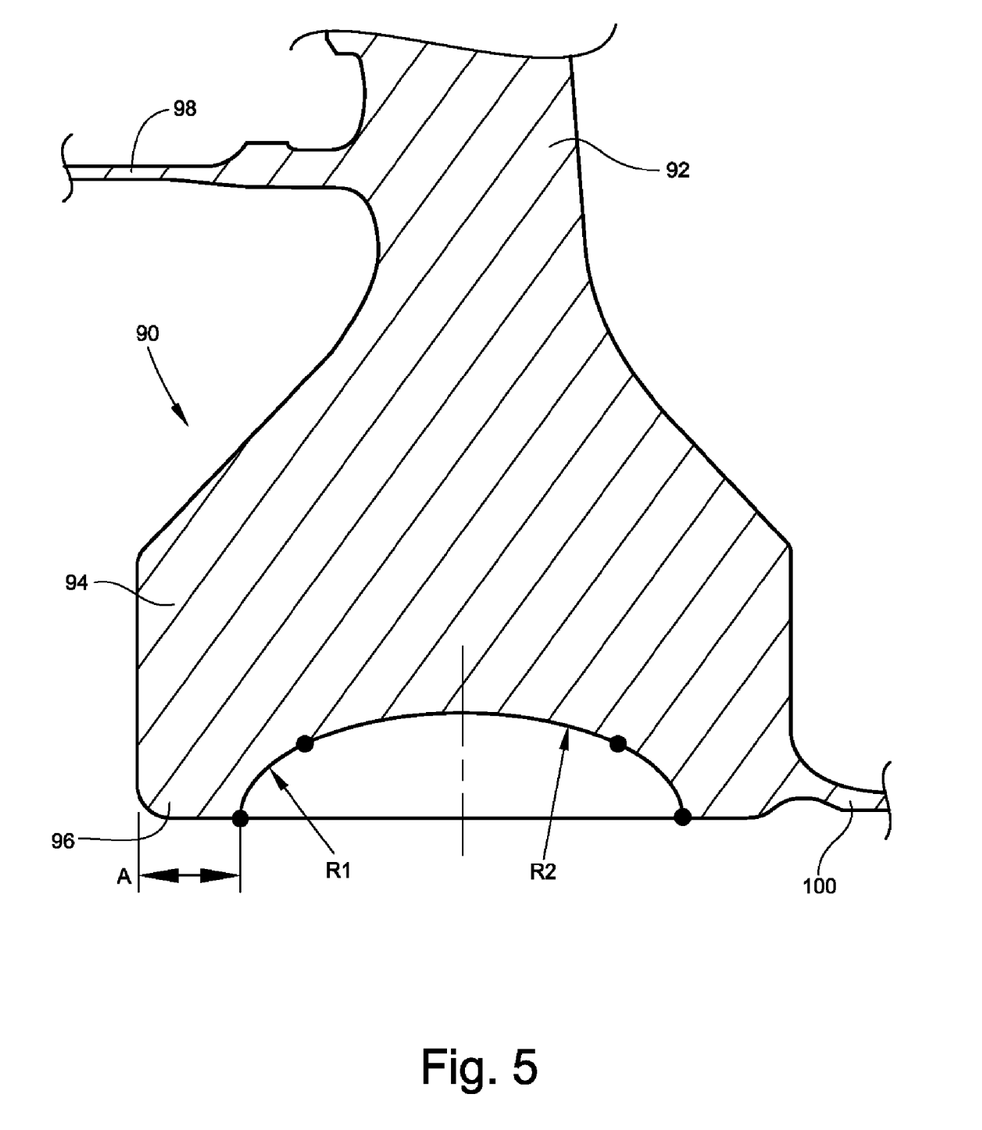
FIG. 5 is a partial vertical cross-sectional view of a HPT disk hub in accordance with one aspect of the invention.

Another alternative is shown in FIG. 5, where a disk 90 includes an integrally-formed web 92 and a disk hub 94 with a hub surface 96. The disk 90 includes an integrally-formed forward shaft 98 and a rearwardly-extending aft shaft 100. The hub surface 96 is provided with a concave annular recess, the shape of which is defined by variable A, R1 and R2. Thermostructural DOE is used to determine the appropriate design space to achieve minimum stress in the hub 94. While the impact on the disk temperature may be moderate, this design may significantly reduce axial stress by decreasing the thermal gradient within the hub 94.

Figure 6:
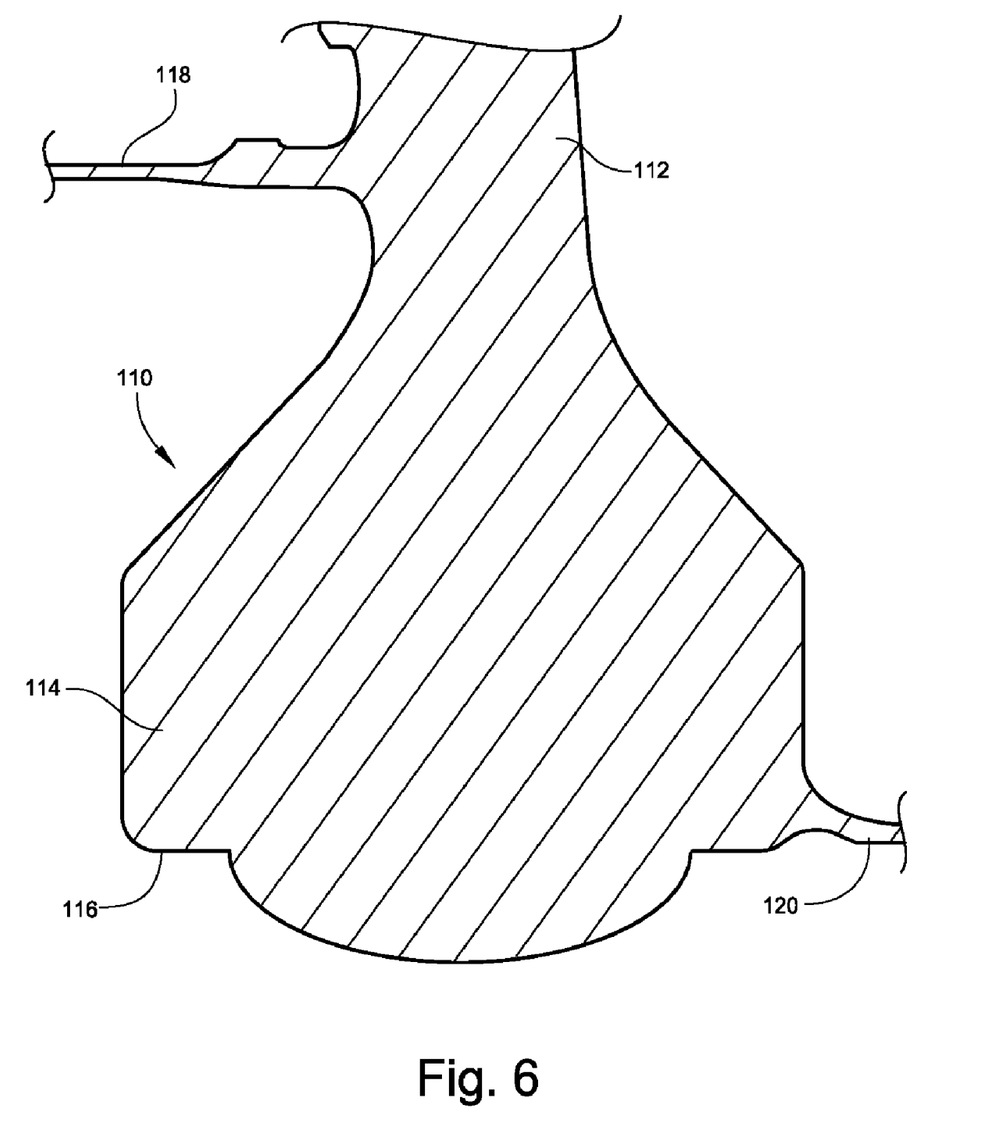
FIG. 6 is a partial vertical cross-sectional view of a HPT disk hub in accordance with one aspect of the invention.

Referring now to FIG. 6, a further modified design is illustrated. A disk 110 includes an integrally-formed web 112 and a disk hub 114 with a hub surface 116. The disk 110 includes an integrally-formed forward shaft 118 and a rearwardly-extending aft shaft 120. The hub surface 116 is provided with a radially-extending annular convex ring, the shape of which is defined by variables essentially as with FIG. 5. Thermostructural DOE is used to determine the appropriate design space to achieve minimum stress in the hub 114. While the impact on the disk temperature may be moderate, this design may significantly reduce axial stress by increasing the distance over which the thermal gradient is formed within the hub 114. This design illustrates the principle that any surface other than a planar axial cylindrical surface will achieve a reduction in peak axial stress. The objective is to reduce peak axial stress while minimizing compensating variations in other undesirable conditions. For example, cylindrical grooves in the hub surface would reduce peak axial stress, but would also introduce very high stress points at the sharp corners that would be highly detrimental to the operational life of the disk. As is evident from the foregoing, the radially-displaced portion of the disk hub surface may be planar, e.g., FIGS. 2 and 3, or non-planar, e.g., FIGS. 4-6—the principal determining factor being the results achieved by DOE studies and the effect of the radially-displaced portion of the disk hub surface on axial stress, hoop stress, burst margin and rim stress.

A disk hub with reduced axial stress, and methods of reducing axial stress in a disk hub are disclosed above. Various details of the invention may be changed without departing from its scope. Furthermore, the foregoing description of the preferred aspect of the invention and the best mode for practicing the invention are provided for the purpose of illustration only and not for the purpose of limitation—the invention being defined by the claims.

What is claimed is:

1. A gas turbine engine, comprising a high pressure turbine section, including a gas turbine engine disk defining a disk hub surface having an annular cylindrical surface section and a radially-displaced annular hub surface section comprising an axially-extending and radially-displaced chamfer for disrupting an axial path from the disk hub to the disk hub surface, the chamfer formed in a forward side of the disk hub and extending forwardly from the annular cylindrical surface section at a position below and in vertical alignment with a geometrically-centered, lowest internal temperature portion of the disk hub, the annular cylindrical surface section extending axially to a rearward side of a rearward shaft for shifting the lowest internal temperature portion and the maximum axial stress out of vertical alignment with the geometrically-centered portion of the disk hub, thereby reducing the magnitude of the axial stress on the disk hub.

2. A gas turbine engine disk according to claim 1, wherein the chamfer of the radially-displaced annular hub surface section extends axially at least one-half of the disk hub surface, and wherein the chamfer is planar and between 0 and 50 degrees.

3. A gas turbine engine disk, comprising:
   (a) a centrally disposed disk hub having an integrally-formed, radially outwardly extending web terminating at an outer end; and
   (b) the disk hub defining a disk hub surface having an annular cylindrical surface section and a radially-displaced annular hub surface section exposed to high-pressure, high temperature discharge gases during engine operation, the radially-displaced annular hub surface section comprising a first concave annular recess having a shape defined by a first radius and a second concave annular recess axially spaced-apart from the first concave annular recess and having a shape defined by a second radius different than the first radius, wherein the first concave annular recess and the second concave annular recess define a convex annular member formed in the hub surface that joins the first concave annular recess and the second concave annular recess.

4. A method of reducing axial stress in a disk hub of a gas turbine disk, comprising the steps of:
   (a) determining the location of stress gradients in a gas turbine disk hub; and
   (b) forming a radially-displaced, axially-extending annular surface section in a disk hub surface of the disk hub that axially displaces the axial stress relative to with a geometrically-centered, lowest internal temperature portion of the disk hub for shifting maximum axial stress on the disk hub out of vertical alignment with a geometrically-centered portion of the disk hub, thereby reducing the magnitude of the axial stress on the disk hub, the radially-displaced, axially-extending annular surface section comprising a first concave annular recess having a shape defined by a first radius and a second concave annular recess axially spaced-apart from the first concave annular recess and having a shape defined by a second radius different than the first radius, wherein the first concave annular recess and the second concave annular recess define a convex annular member formed in the hub surface that joins the first concave annular recess and the second concave annular recess.

5. A gas turbine engine disk comprising:
   (a) a centrally disposed disk hub having an integrally-formed, radially outwardly extending web terminating at an outer end; and
   (b) the disk hub defining a disk hub surface having an annular cylindrical surface section and a radially-displaced annular hub surface section exposed to high pressure, high temperature discharge gases during engine operation, the radially-displaced annular hub surface section comprising at least one radially-extending annular continuously curved convex ring and acting as an axial free surface mitigating the formation of axial stress in the disk hub.

6. A method of reducing axial stress in a disk hub of a gas turbine disk, comprising the steps of:
(a) determining the location of stress gradients in a gas turbine disk hub; and
(b) forming a radially-displaced, axially-extending annular surface section in a disk hub surface of the disk hub that axially displaces the axial stress relative to with a geometrically-centered, lowest internal temperature portion of the disk hub for shifting maximum axial stress on the disk hub out of vertical alignment with a geometrically-centered portion of the disk hub, thereby reducing the magnitude of the axial stress on the disk hub, the radially-displaced, axially-extending annular surface section comprising at least one radially-extending annular continuously curved convex ring and acting as an axial free surface mitigating the formation of axial stress in the disk hub.

* * * * *

UNITED STATES PATENT AND TRADEMARK OFFICE
CERTIFICATE OF CORRECTION

PATENT NO. : 7,578,656 B2  Page 1 of 1
APPLICATION NO. : 11/306224
DATED : August 25, 2009
INVENTOR(S) : Higgins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 618 days.

Signed and Sealed this

Seventh Day of September, 2010

David J. Kappos
*Director of the United States Patent and Trademark Office*